(12) United States Patent
Yuan

(10) Patent No.: US 8,218,299 B2
(45) Date of Patent: Jul. 10, 2012

(54) ELECTRONIC DEVICE WITH SUPPORT

(75) Inventor: Hui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 215 days.

(21) Appl. No.: 12/788,311

(22) Filed: May 27, 2010

(65) Prior Publication Data

US 2011/0182005 A1    Jul. 28, 2011

(30) Foreign Application Priority Data

Jan. 28, 2010  (CN) .......................... 2010 1 0300816

(51) Int. Cl.
*G06F 1/16* (2006.01)
*A47F 7/00* (2006.01)
(52) U.S. Cl. ......... 361/679.02; 361/679.55; 361/679.01; 211/26.1
(58) Field of Classification Search .......... 361/679.01–679.02, 679.55–679.56, 361/679.59; 248/441.1, 454, 455; 211/26.1
See application file for complete search history.

(56) References Cited

U.S. PATENT DOCUMENTS

| | | | | |
|---|---|---|---|---|
| 4,815,683 A | * | 3/1989 | Ferrante | 248/205.2 |
| D332,360 S | * | 1/1993 | Golds | D6/475 |
| 5,607,135 A | * | 3/1997 | Yamada | 248/456 |
| 6,275,379 B1 | * | 8/2001 | Quinno et al. | 361/679.01 |
| 6,856,506 B2 | * | 2/2005 | Doherty et al. | 361/679.27 |
| D551,008 S | * | 9/2007 | Hidalgo | D6/567 |
| 2010/0195279 A1 | * | 8/2010 | Michael | 361/679.41 |

FOREIGN PATENT DOCUMENTS

JP    08318793 A  * 12/1996

* cited by examiner

*Primary Examiner* — Zachary M Pape
(74) *Attorney, Agent, or Firm* — Altis Law Group, Inc.

(57) ABSTRACT

An electronic device includes a body, two clamps, a remote control, a connecting member and two supports. The two clamps are oppositely fastened to two lateral sides of the body. The remote control is seated between the clamps on a rear side of the body. The connecting member is positioned under the remote control and slidingly connected to the clamps, and configured for carrying the remote control. Each of the supports includes a holder rotatablely connected to one of the two clamps and a bracket extending from the holder towards the body for holding the connecting member.

16 Claims, 7 Drawing Sheets

ELECTRONIC DEVICE WITH SUPPORT

BACKGROUND

1. Technical Field

The present disclosure relates to electronic devices, especially to an electronic device with a support.

2. Description of Related Art

Electronic devices, such as electronic books, personal digital assistants, are becoming more and more popular for their portability and light-weight. Usually such an electronic device further includes a remote control. Because the remote control is separate from the electronic device it is often misplaced, and troublesome to locate.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
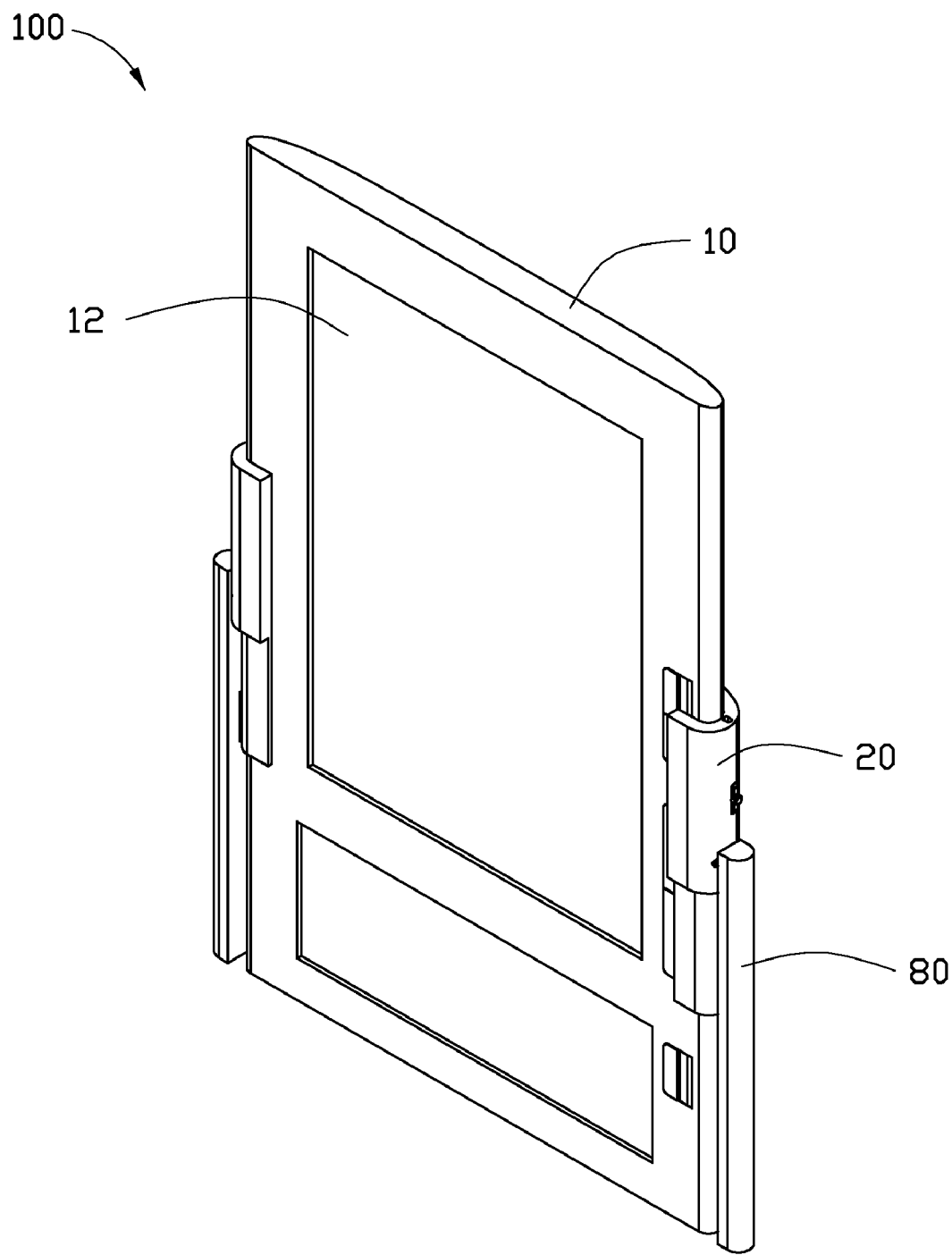
FIG. 1 is an isometric view of an electronic device, according to an exemplary embodiment.
Figure 2:
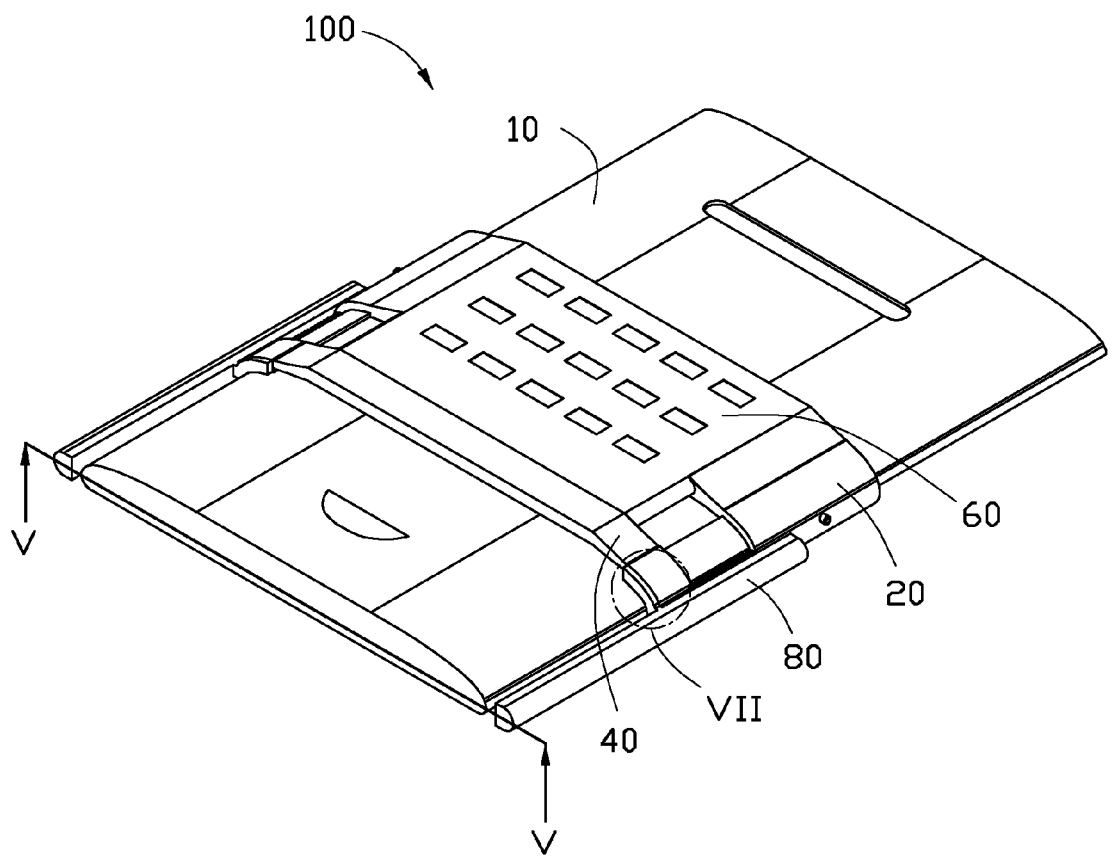
FIG. 2 is similar to FIG. 1, but viewed from the back.
Figure 3:
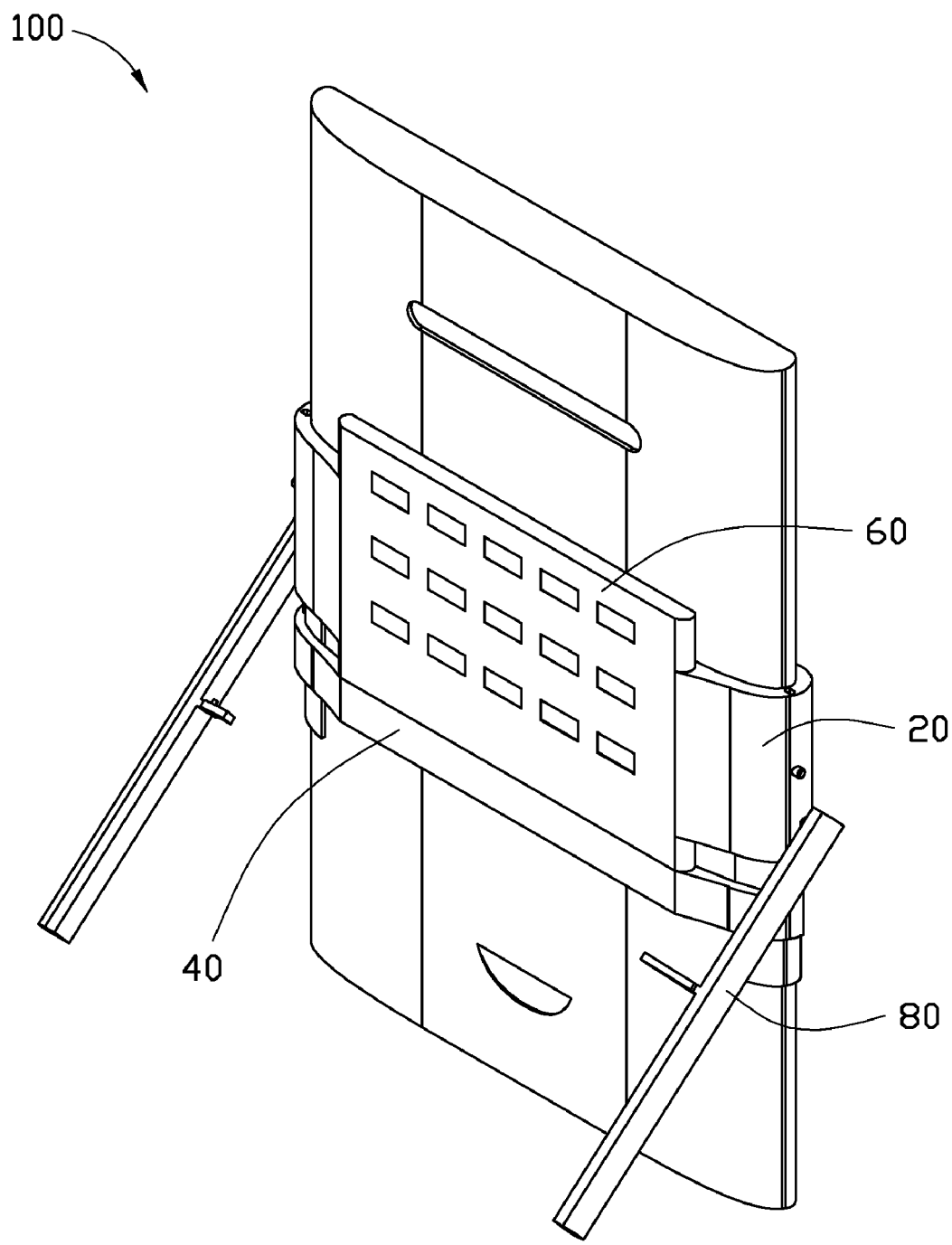
FIG. 3 is an isometric view of the electronic book in FIG. 2, with supports of the electronic device in use.

Referring to FIGS. 1 and 2, an electronic device 100 according to an exemplary embodiment is shown. The electronic device 100 includes a body 10, two clamps 20, two supports 80, a connecting member 40, and a remote control 60. A display panel 12 is installed in a front side of the body 10. The two clamps 20 are oppositely fixed to two lateral sides of the body 10. The two supports 80 are respectively rotatably connected to the two clamps 20. The remote control 60 is seated between the two clamps 20 and on the rear side of the body 10. The connecting member 40 is positioned under the remote control 60, and configured for holding the remote control 60. Referring also to FIG. 3, the connecting member 40 is slidable relative to the clamps 20 to push the remote control 60 to partly slide out of the clamps 20 for easy grasping by users, and the two supports 80 are rotatable around the clamps 20 to hold the body 10.

Figure 4:
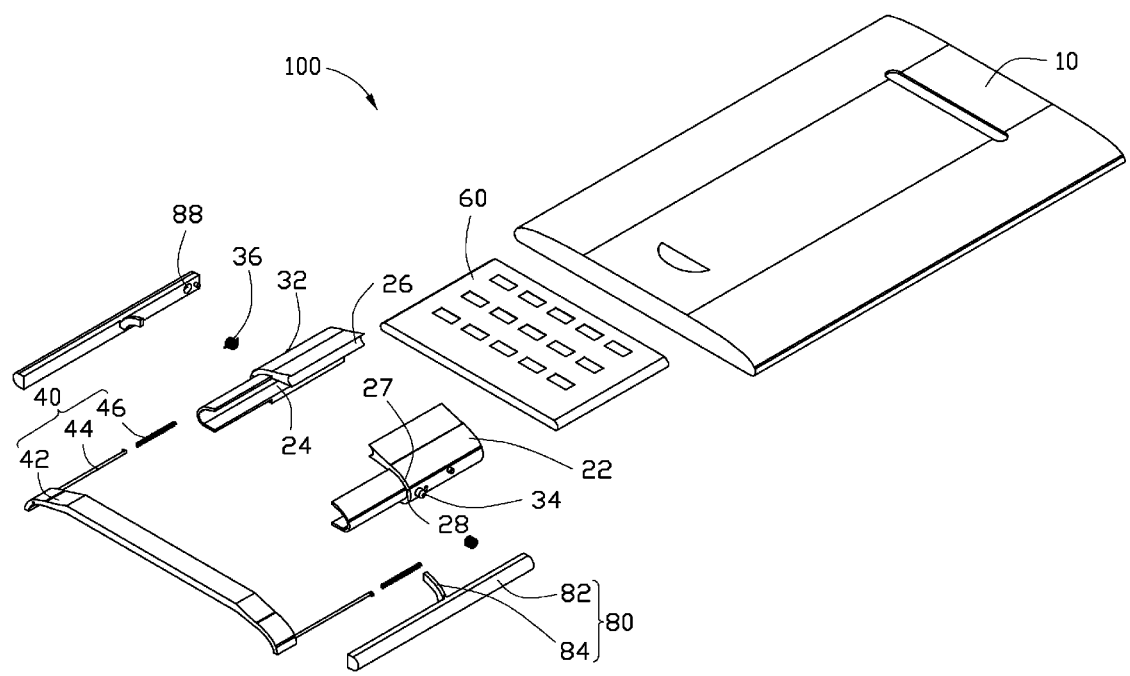
FIG. 4 is an exploded, isometric view of the electronic device in FIG. 2.
Figure 5:
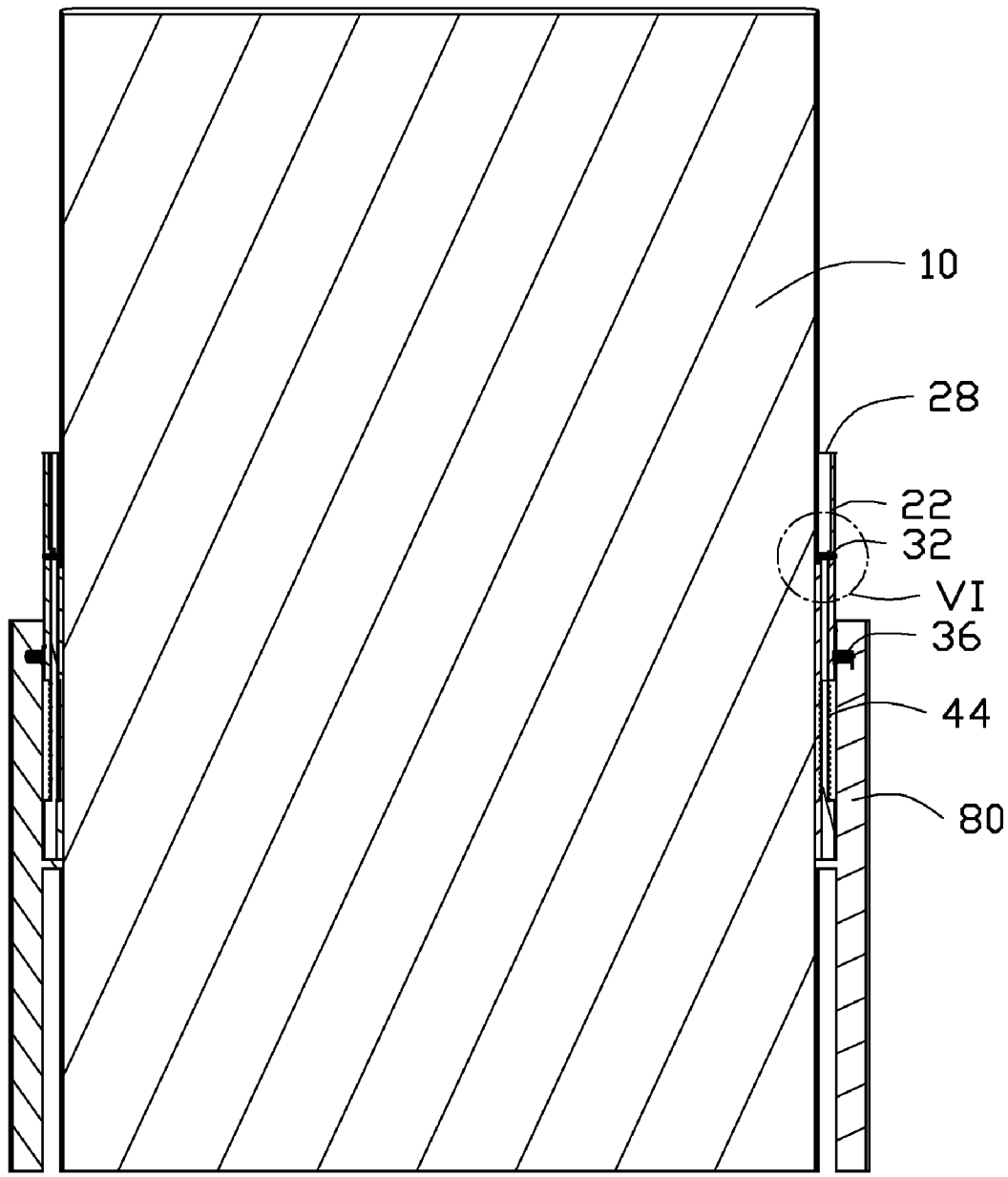
FIG. 5 is a cross-sectional view taken along line V-V in FIG. 2.
Figure 6:
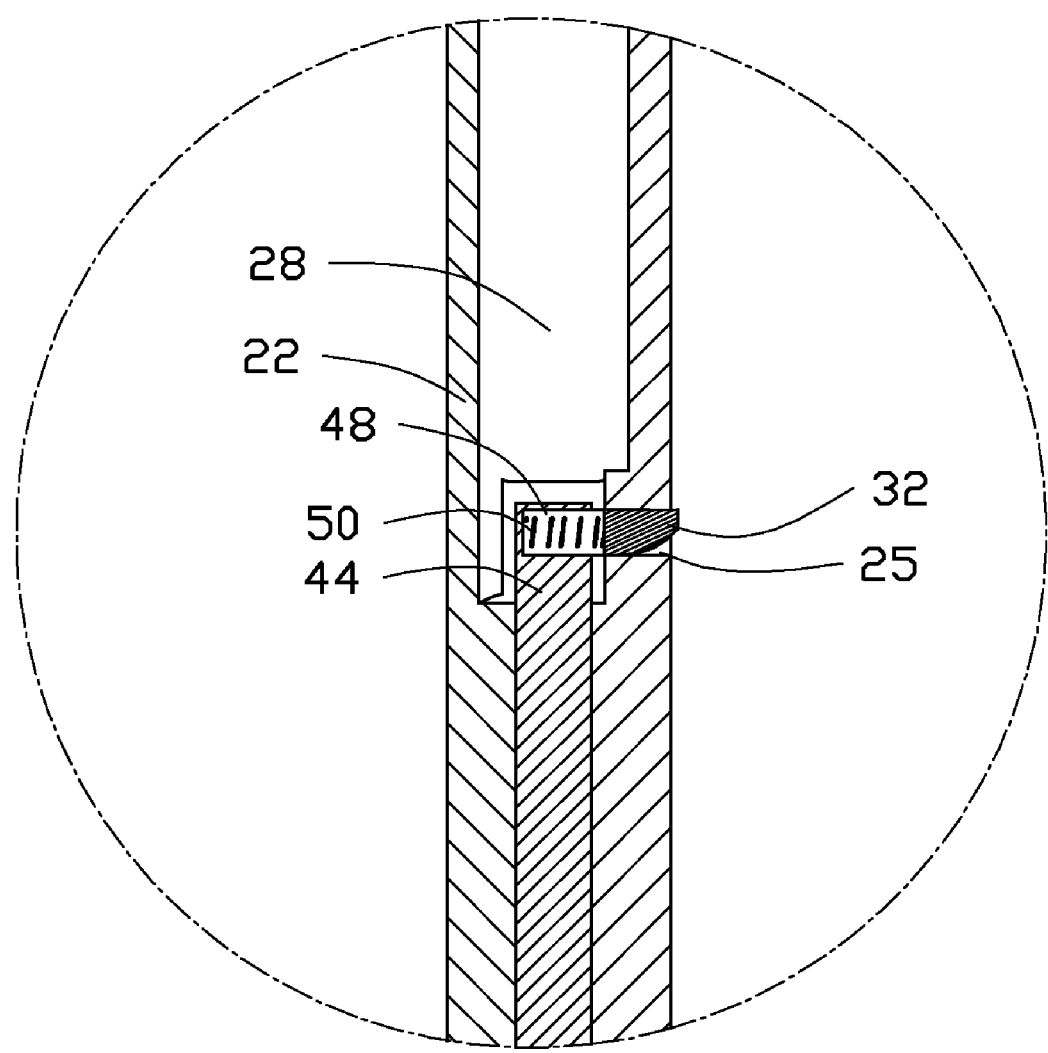
FIG. 6 is an enlarged view of VI of the electronic device in FIG. 5.

Referring to FIG. 4, the clamps 20 are tile-shaped and each include a step 27, and a clamping portion 22. The clamping portions 22 each define a clamping groove 24 along the length direction therethrough. The two clamping grooves 24 are opposite to each other. The two lateral sides of the body 10 are inserted into the two clamping grooves 24. The two clamping portions 22 extend towards each other and define slots 26 at the extending portion. The slots 26 are parallel to the clamping grooves 24 and configured for receiving the remote controller 60. Referring also to FIG. 5, the clamping portions 22 each define a receiving hole 28 extending from the step 27 to the end away from the connecting member 40. The receiving holes 28 are parallel to the clamping grooves 24. Referring also to FIG. 6, the clamping portions 22 each define a through hole 25 facing the corresponding lateral side of the body 10. Each through hole 25 communicates with the corresponding receiving hole 28.

Referring to FIG. 4, each support 80 includes a holder 82 and a bracket 84. The bracket 84 extends from the holder 82 towards the body 10, and is configured for holding the connecting member 40. The holder 82 defines an opening 88 facing the corresponding clamping portion 22. A spindle 34 protrudes from each clamping portion 22. The spindle 34 is received in the opening 88, rotatably connecting the holder 82 to the clamp 20. A torsion spring 36 is fit over each spindle 34. One end of each torsion spring 36 is fastened to the corresponding clamping portion 22, and the other ends of the torsion springs 36 are received in the openings 88. The torsion springs 36 supply elasticity to impel the holders 80 to rotate around the clamps 20 via the spindle 34.

The connecting member 40 includes a frame 42, two guiding bars 44, and two first elastic members 46. The frame 42 extends across the body 10 for securing the remote controller 60. Each guiding bar 44 extends from the frame 42 towards a corresponding clamp 20. The first elastic members 46 are stretched and fit over the guiding bar 44 with two ends being fastened on the corresponding clamping portion 22 and the frame 42. Referring also to FIG. 6, each guiding bar 44 is slidingly located in the corresponding receiving hole 28. The free end of each guiding bar 44 defines an accommodating groove 48 aligned with the through hole 25. The electrical device 100 further includes two buttons 32 and two second elastic members 50. One end of each second elastic member 50 presses into the corresponding accommodating groove 48, the other end of the second elastic members 50 is fixed to the corresponding button 32. The buttons 32 are received in the through holes 25 for preventing the guiding bar 44 from sliding along the receiving hole 28. When the buttons 32 are pressed entirely into the receiving holes 28, under the elastic force of the first elastic members 46, the frame 42 and the guiding bars 44 slide upward along the receiving hole 28, correspondingly, the frame 42 impels the remote controller 60 to partly slide out of the clamp 20. Then user can take the remote controller 60 out and use it.

Figure 7:
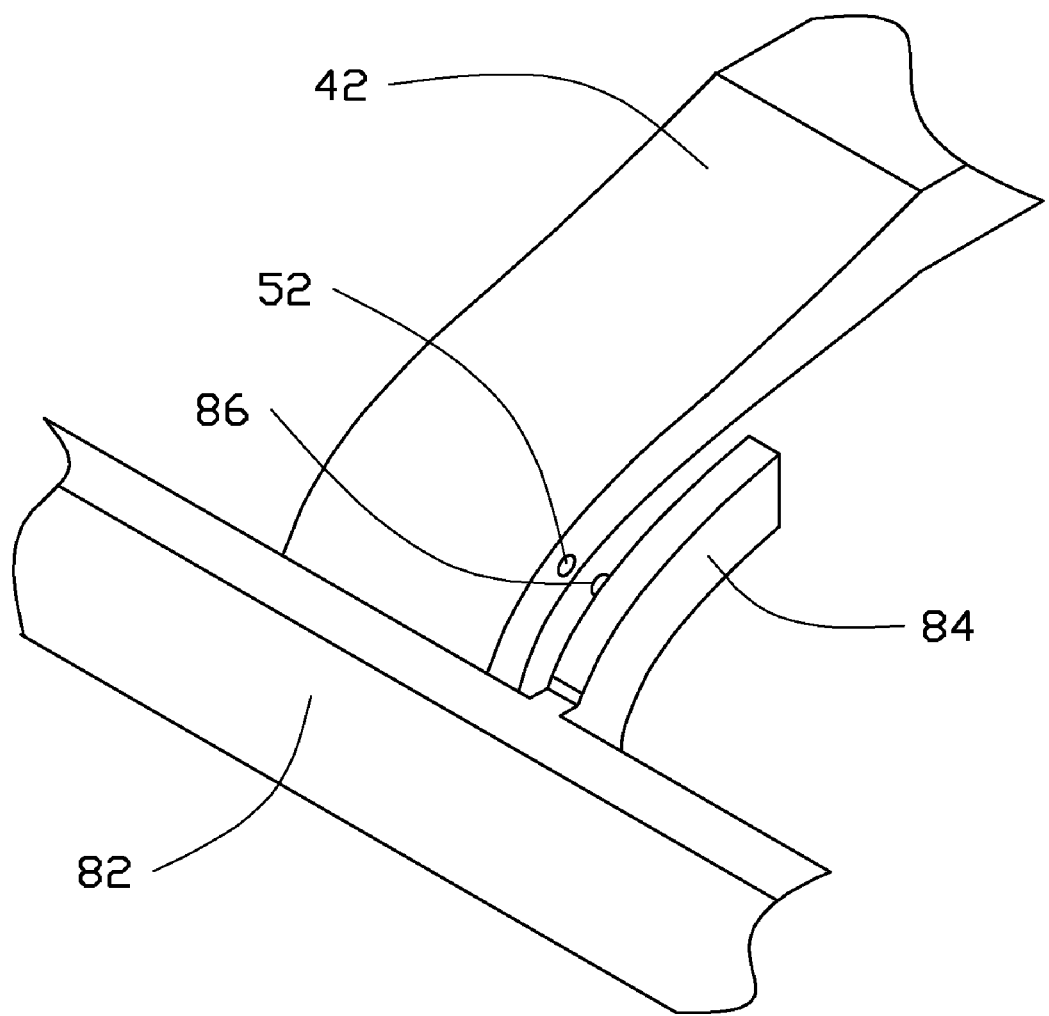
FIG. 7 is an exploded view of VII of the electronic device in FIG. 2.

Referring FIGS. 4 and 7, each end of the frame 42 defines an accepting hole 52. The brackets 84 each define a knob 86 facing the frame 42. The knobs 86 can be inserted into the accepting holes 52 respectively, preventing the supports 80 from rotating around the spindles 34. When the frame 42 moves upward and the knobs 86 leave the accepting holes 52, under the force of the torsion springs 36, the supports 80 rotate around the respective spindle 34 and support the body 10.

Referring FIGS. 2, 4 and 6, when a user wants to return the remote control 60, the user rotates the two supports 80 to align with the two lateral sides of the body 10, and pushes the frame 42 downwardly. When the buttons 32 align with the through holes 25, under the elastic force of the second elastic members 50, the buttons 32 move out the receiving holes 28 and enter the through holes 25 to fix the clamps 20. Correspondingly, the knobs 86 are received in the accepting holes 52 to fix the supports 80 to the connecting member 40. Then the remote control 60 can be placed in the two sliding grooves 26.

It is to be understood, however, that even though numerous characteristics and advantages of the present disclosure have been set forth in the foregoing description, together with details of the structure and function of the present disclosure, the present disclosure is illustrative only, and changes may be made in details, especially in matters of shape, size, and arrangement of parts within the principles of the present disclosure to the full extent indicated by the broad general meaning of the terms in which the appended claims are expressed.

What is claimed is:

1. An electronic device comprising:
a body;
two clamps oppositely fastened to two lateral sides of the body;
a remote control seated between the clamps on a rear side of the body;
a connecting member positioned under the remote control and slidingly connected to the clamps, and configured for carrying the remote; and
two supports, each of the supports comprising a holder rotatablely connected to one of the two clamps and a bracket extending from the holder towards the body for holding the connecting member.

2. The electronic device of claim 1, wherein each clamp defines a receiving hole, the connecting member comprises a frame extending across the body and two guiding bars extending from two opposite ends of the frame towards the corresponding clamp, each guiding bar is slidably received in the corresponding receiving hole.

3. The electronic device of claim 2, wherein the connecting member further comprises two first elastic members mounted on the guiding bars, two ends of each first elastic member are respectively fastened on the corresponding clamp and the frame.

4. The electronic device of claim 2, further comprising two buttons and two second elastic members, each clamp defines a through hole communicating with the corresponding receiving hole, buttons are respectively received in the through holes, each guiding bar defines an accommodating groove aligned with the corresponding through hole, one end of each second elastic member presses into the corresponding accommodating groove, and the other ends of the second elastic members are fixed to the corresponding button.

5. The electronic book of claim 1, wherein each bracket defines a knob, each end of the connecting member defines an accepting hole, the knobs are respectively received in the accepting holes.

6. The electronic device of claim 1, wherein a spindle protrudes from each clamp, each holder defines an opening for receiving the spindles, the electronic device further comprises torsion springs respectively fit over the spindles, one end of each torsion spring is fastened to the corresponding clamp, and the other end of the torsion spring is received in the openings.

7. The electronic device of claim 1, wherein each clamp defines a clamping groove along a length direction therethrough, the body is inserted into the clamping grooves.

8. The electronic device of claim 1, wherein the clamps define slots facing each other, the remote control is seated in the slots.

9. An electronic device comprising:
a body;
two clamps oppositely fastened to two lateral sides of the body;
a remote control seated between the clamps on a rear side of the body;
a connecting member positioned under the remote control and slidingly connected to the clamps, and configured for carrying the remote;
two supports, each of the supports comprising a holder rotatablely connected to one of the two clamps and a bracket extending from the holder towards the body for holding the connecting member; and
two elastic members connected between the two clamps and the supports to rotate the supports about the clamps;
wherein when the supports rotate, the remote control is pushed by the connecting member to move relative to the clamps.

10. The electronic device of claim 9, wherein each clamp defines a receiving hole, the connecting member comprises a frame extending across the body and two guiding bars extending from two opposite ends of the frame towards the corresponding clamp, each guiding bar is slidably received in the corresponding receiving hole.

11. The electronic device of claim 10, wherein the connecting member further comprises two first elastic members mounted on the guiding bars, two ends of each first elastic member are respectively fastened on the corresponding clamp and the frame.

12. The electronic device of claim 10, further comprising two buttons and two second elastic members, each clamp defines a through hole communicating with the corresponding receiving hole, buttons are respectively received in the through holes, each guiding bar defines an accommodating groove aligned with the corresponding through hole, one end of each second elastic member presses into the corresponding accommodating groove, and the other ends of the second elastic members are fixed to the corresponding button.

13. The electronic book of claim 9, wherein each bracket defines a knob, each end of the connecting member defines an accepting hole, the knobs are respectively received in the accepting holes.

14. The electronic device of claim 9, wherein a spindle protrudes from each clamp, each holder defines an opening for receiving the spindles, the elastic members each are torsion spring and respectively fit over the spindles, one end of each torsion spring is fastened to the corresponding clamp, and the other end of the torsion spring is received in the openings.

15. The electronic device of claim 9, wherein each clamp defines a clamping groove along a length direction therethrough, the body is inserted into the clamping grooves.

16. The electronic device of claim 9, wherein the clamps define slots facing each other, the remote control is seated in the slots.

* * * * *